(12) United States Patent
Nakano et al.

(10) Patent No.: US 12,445,081 B2
(45) Date of Patent: Oct. 14, 2025

(54) WORKING TOOL AND DRILLING METHOD

(71) Applicant: Koki Holdings Co., Ltd., Tokyo (JP)

(72) Inventors: Ryosuke Nakano, Ibaraki (JP);
Tomoaki Sudo, Ibaraki (JP); Ken Inui,
Ibaraki (JP); Chisho So, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 471 days.

(21) Appl. No.: 18/014,782

(22) PCT Filed: Jun. 25, 2021

(86) PCT No.: PCT/JP2021/024135
§ 371 (c)(1),
(2) Date: Jan. 6, 2023

(87) PCT Pub. No.: WO2022/014299
PCT Pub. Date: Jan. 20, 2022

(65) Prior Publication Data
US 2024/0243685 A1 Jul. 18, 2024

(30) Foreign Application Priority Data

Jul. 15, 2020 (JP) ................................. 2020-121567

(51) Int. Cl.
*B23B 45/02* (2006.01)
*H02K 7/116* (2006.01)
(Continued)

(52) U.S. Cl.
CPC ............ *H02P 29/027* (2013.01); *B23B 45/02* (2013.01); *H02K 7/116* (2013.01); *H02K 7/145* (2013.01); *H02K 9/06* (2013.01)

(58) Field of Classification Search
CPC ... H02P 29/027; B23B 45/02; B23B 2270/32; H02K 7/116; H02K 7/145; H02K 9/06; B25F 5/00
(Continued)

(56) References Cited

U.S. PATENT DOCUMENTS 8,555,997 B2 * 10/2013 Carrier ...................... B25F 5/00
173/2
9,144,875 B2 * 9/2015 Schlesak ................ B23Q 17/22
(Continued)

FOREIGN PATENT DOCUMENTS

JP H109-277195 A 10/1997
JP 2005-074559 A 3/2005
(Continued)

OTHER PUBLICATIONS

International Search Report issued in corresponding International Application No. PCT/JP2021/024135, dated Sep. 7, 2021 w/English Translation (5 pages).
(Continued)

*Primary Examiner* — Robert F Long
(74) *Attorney, Agent, or Firm* — Rimon P.C.

(57) ABSTRACT

A working tool and a drilling method capable of improving workability are provided. A working tool includes a motor, a trigger switch to instruct the driving of the motor, and a microcontroller to control the driving of the motor. The microcontroller stops the motor without transitioning to a retry mode when detecting a rapid increase of a motor current. The microcontroller transitions to the retry mode when detecting an overload without accompanying the rapid increase of the motor current. In the retry mode, the activation and stop of the motor are repeated. When the load applied to a tool bit is eliminated during execution of the
(Continued)

retry mode, the microcontroller returns to a normal mode while the trigger switch is kept on.

13 Claims, 7 Drawing Sheets

(51) Int. Cl.
  *H02K 7/14* (2006.01)
  *H02K 9/06* (2006.01)
  *H02P 29/024* (2016.01)

(58) Field of Classification Search
  USPC ...................................... 408/1, 8–15, 76, 145
  See application file for complete search history.

(56) References Cited

U.S. PATENT DOCUMENTS

| | | | |
|---|---|---|---|
| 10,406,662 B2* | 9/2019 | Leh | B25B 23/1475 |
| 10,413,974 B2* | 9/2019 | Koslowski | B23B 51/04 |
| 10,646,982 B2* | 5/2020 | Dey, IV | B25B 21/02 |
| 10,688,614 B2* | 6/2020 | Schaer | B25D 16/00 |
| 10,780,563 B2* | 9/2020 | Ichikawa | B25D 16/006 |
| 12,186,865 B2* | 1/2025 | Murui | B25B 23/147 |
| 2005/0025586 A1 | 2/2005 | Mikiya et al. | |
| 2007/0084613 A1 | 4/2007 | Zhang et al. | |
| 2011/0242259 A1* | 10/2011 | Kubo | B41J 2/471 |
| | | | 347/224 |
| 2012/0103643 A1 | 5/2012 | Binder et al. | |
| 2016/0207187 A1 | 7/2016 | Nishikawa et al. | |
| 2022/0347826 A1* | 11/2022 | Schroeder | B25C 1/06 |
| 2023/0166388 A1* | 6/2023 | Wueste | B25B 21/00 |
| | | | 81/52 |

FOREIGN PATENT DOCUMENTS

| | | | | |
|---|---|---|---|---|
| JP | 2011-011313 A | 1/2011 | | |
| JP | 2012-196746 A | 10/2012 | | |
| JP | 5895211 B2 | 3/2016 | | |
| WO | WO-2012127851 A2 * | 9/2012 | | H02P 6/15 |
| WO | 2015/029660 A1 | 3/2015 | | |

OTHER PUBLICATIONS

Extended European Search Report received in EP Application No. 21841806.9, dated Nov. 15, 2023.

* cited by examiner

1 WORKING TOOL

1 WORKING TOOL

1 WORKING TOOL

WORKING TOOL AND DRILLING METHOD

CROSS REFERENCE TO RELATED APPLICATIONS

This application is the U.S. National Phase under 35 U.S.C. § 371 of International Application No. PCT/JP2021/024135, filed on Jun. 25, 2021, which claims the benefit of Japanese Application No. 2020-121567, filed on Jul. 15, 2020, the entire contents of each are hereby incorporated by reference.

TECHNICAL FIELD

The present invention relates to a working tool such as a vibration drill and a drilling method using the same.

BACKGROUND ART

Patent Document 1 listed below discloses a drilling device having a lock release mode for releasing a locked state when a tool bit and a workpiece are locked during working. Patent Document 2 listed below discloses a power tool configured to increase an output to overcome a cause when detecting that a tool bit is about to be in a locked state due to a hard material such as a stone during working.

RELATED ART DOCUMENTS

Patent Documents

Patent Document 1: International Patent Publication No. WO 2015/029660
Patent Document 2: Japanese Unexamined Patent Application Publication No. H09-277195

SUMMARY OF THE INVENTION

Problem to be Solved by the Invention

In the drilling device in Patent Document 1, a worker needs to perform the operation of releasing the locked state and restarting the work when the drilling device is in the locked state. In this operation, the worker needs to perform the operation of releasing the trigger and pulling the trigger again at least once and needs to operate the trigger at least twice along with the trigger operation performed before being in the locked state, and thus there is a problem of poor workability.

In the power tool in Patent Document 2, when detecting that a tool bit is about to be locked, the output is increased to overcome the cause, and thus the torque acting on the hand is large. In addition, if the tool bit is locked in a state where the output is increased, kickback more than conventional case may be generated. Further, the trigger needs to be operated again for restarting the motor stopped by the lock.

The present invention has been made in view of such circumstances, and an object thereof is to provide a working tool and a drilling method capable of improving workability.

An aspect of the present invention is a working tool. This working tool includes: a motor; a working portion driven by the motor and configured to be able to perform a predetermined work; a control unit configured to control the motor; and an operation unit configured to instruct the control unit to drive the motor, wherein the control unit is configured to execute a normal mode for continuously driving the motor when the operation unit is operated, execute a retry mode in which a stop control to stop the motor and a retry control to drive the motor at a torque smaller than that when a first condition is satisfied are alternately repeated when the torque applied to the motor satisfies the first condition during execution of the normal mode, and stop the retry mode and continuously drive the motor when the torque applied to the motor satisfies a second condition during execution of the retry mode.

The control unit may be configured to determine that the first condition is satisfied when the torque applied to the motor increases in a predetermined manner and/or when a rotation speed of the motor decreases in a predetermined manner.

The control unit may be configured to determine that the first condition is satisfied when the torque applied to the motor reaches a first threshold.

The control unit may be configured to perform the retry control until the torque applied to the motor reaches a second threshold and perform the stop control when the torque applied to the motor reaches the second threshold, in the retry mode.

The second threshold may be defined as a value smaller than the first threshold.

The control unit may be configured to determine that the second condition is satisfied when a state where the torque applied to the motor does not reach the second threshold continues for a predetermined time.

The control unit may continue the stop control when the retry control is repeated a predetermined number of times.

Another aspect of the present invention is a drilling method using a working tool. The working tool used in this method includes: a motor; a tool bit driven by the motor and configured to make a hole in a member; a control unit configured to control the motor; and an operation unit configured to instruct the control unit to drive the motor, and the drilling method includes: a first step in which a worker operates the operation unit and the control unit continuously drives the motor to rotate the tool bit, thereby making a hole in a member; a second step in which the tool bit is stopped in the hole due to a load; a third step in which the control unit executes a retry mode in which a stop control to stop the motor and a retry control to drive the motor are alternately repeated; a fourth step in which the worker eliminates the load applied to the tool bit; and a fifth step in which the control unit stops the retry mode and continuously drives the motor to rotate the tool bit, thereby making a hole in the member again.

In the retry control in the third step, the motor may be driven at a torque smaller than that of the motor driving in the first step.

In the motor driving in the fifth step, the motor may be driven at a torque larger than that of the motor driving in the third step.

The stop control may be continued when the retry control in the third step is repeated a predetermined number of times.

When increase of the load per unit time in the second step is a rapid increase, the motor driving may be stopped without transitioning to the third step.

The tool bit may be continuously in a stop state from when it is stopped in the second step to when it is rotated in the fifth step.

Note that any combination of the above-described constituent elements and conversion of the expression in the present invention between a device, a system, and the like are also effective as aspects of the present invention.

Effects of the Invention

According to the present invention, it is possible to provide a working tool and a drilling method capable of improving workability.

DETAILED DESCRIPTION OF PREFERRED EMBODIMENTS

Figure 1:
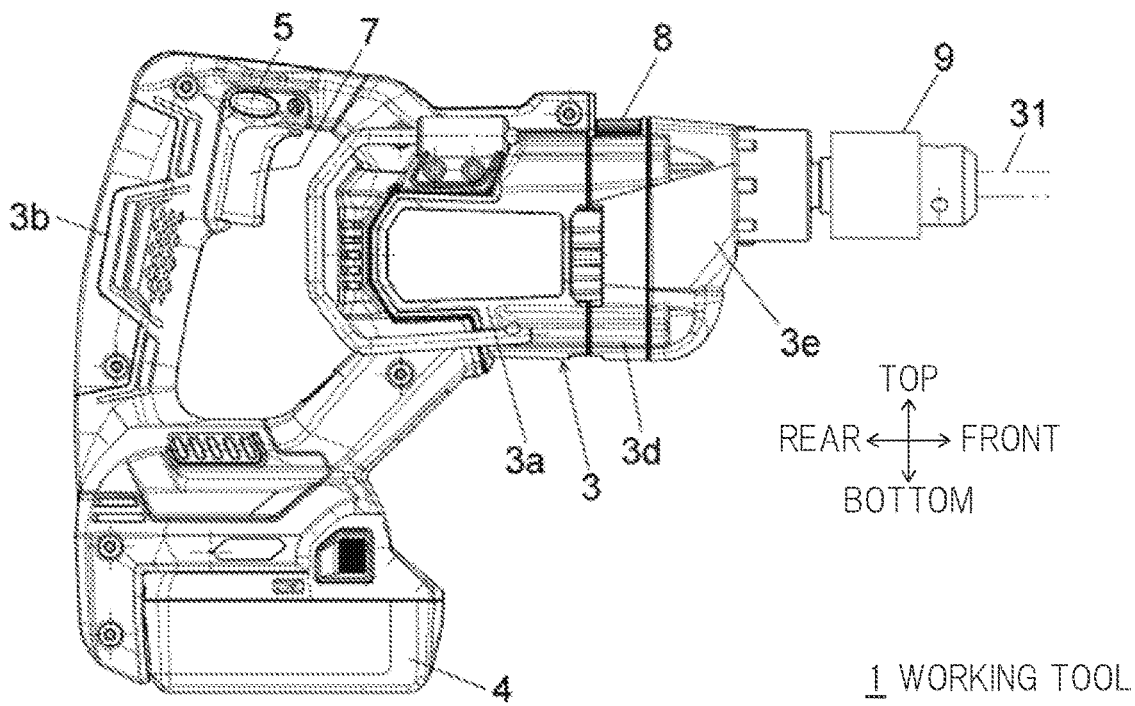
FIG. 1 is a side view of a working tool 1 according to the embodiment of the present invention.
Figure 2:
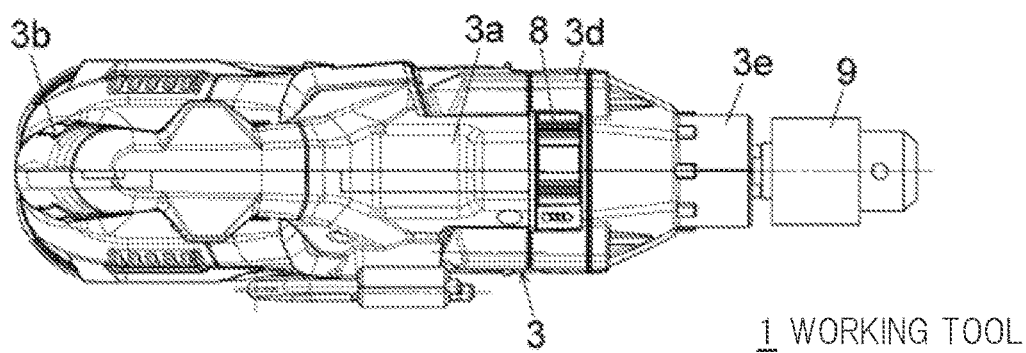
FIG. 2 is a plan view of the working tool 1.

In the following description, the same or equivalent components, members, and the like shown in the drawings are denoted by the same reference characters, and redundant description will be omitted as appropriate. The embodiment is just an example and does not limit the invention. All features and combinations thereof described in the embodiment are not necessarily essential to the invention.

Figure 3:
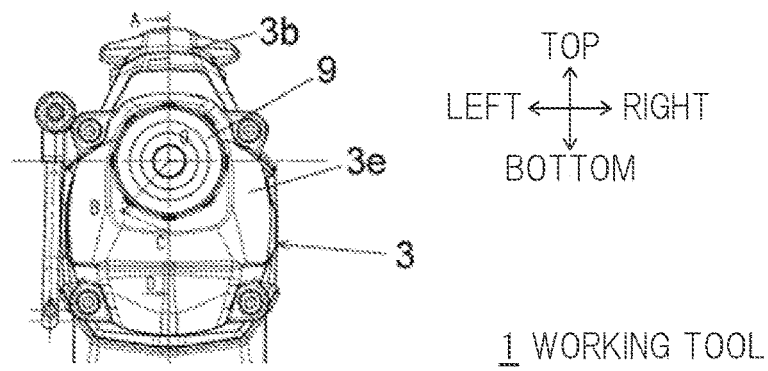
FIG. 3 is a front view of an upper part of the working tool 1.

The present embodiment relates to a working tool 1. The working tool 1 is a vibration drill. A mechanical configuration of the working tool 1 will be described with reference to FIG. 1 to FIG. 4. In FIG. 1 and FIG. 3, front-rear, top-bottom, and left-right directions orthogonal to each other in the working tool 1 are defined. In order to show the configuration of meshing in a deceleration mechanism, a partial cross-sectional view taken along the line A-O-B-C-D in FIG. 3 is also shown in FIG. 4.

The working tool 1 includes a housing 3. The housing 3 includes a motor housing 3a, a handle portion 3b, a fan guide 3c, an intermediate cover 3d, and a gear cover 3e. The handle portion 3b extends from a rear portion of the motor housing 3a. The handle portion 3b has a D shape in a side view. The intermediate cover 3d is connected and fixed to a front portion of the motor housing 3a with the fan guide 3c interposed therebetween. The gear cover 3e is connected and fixed to a front portion of the intermediate cover 3d.

The handle portion 3b is provided with a forward-reverse switch 5 and a trigger switch 7. The trigger switch 7 is an operation unit with which the worker switches the motor 6 between driving and stopping, and is an operation unit configured to instruct a microcontroller 40 in FIG. 5 to drive the motor 6 in accordance with an operation of the worker. When the worker pulls the trigger switch 7 (turns on), the motor 6 is driven, and when the worker releases the operation of the trigger switch 7 (turns off), the motor 6 stops. The forward-reverse switch 5 is configured to be able to switch the rotation direction of the motor 6 when the trigger switch 7 is operated. As shown in FIG. 4, a control board 26 is housed in a lower portion of the handle portion 3b. A switching element 27 and the like are provided on the control board 26. A battery pack 4 serving as a power source of the working tool 1 is detachably connected to a lower end portion of the handle portion 3b.

Figure 4:
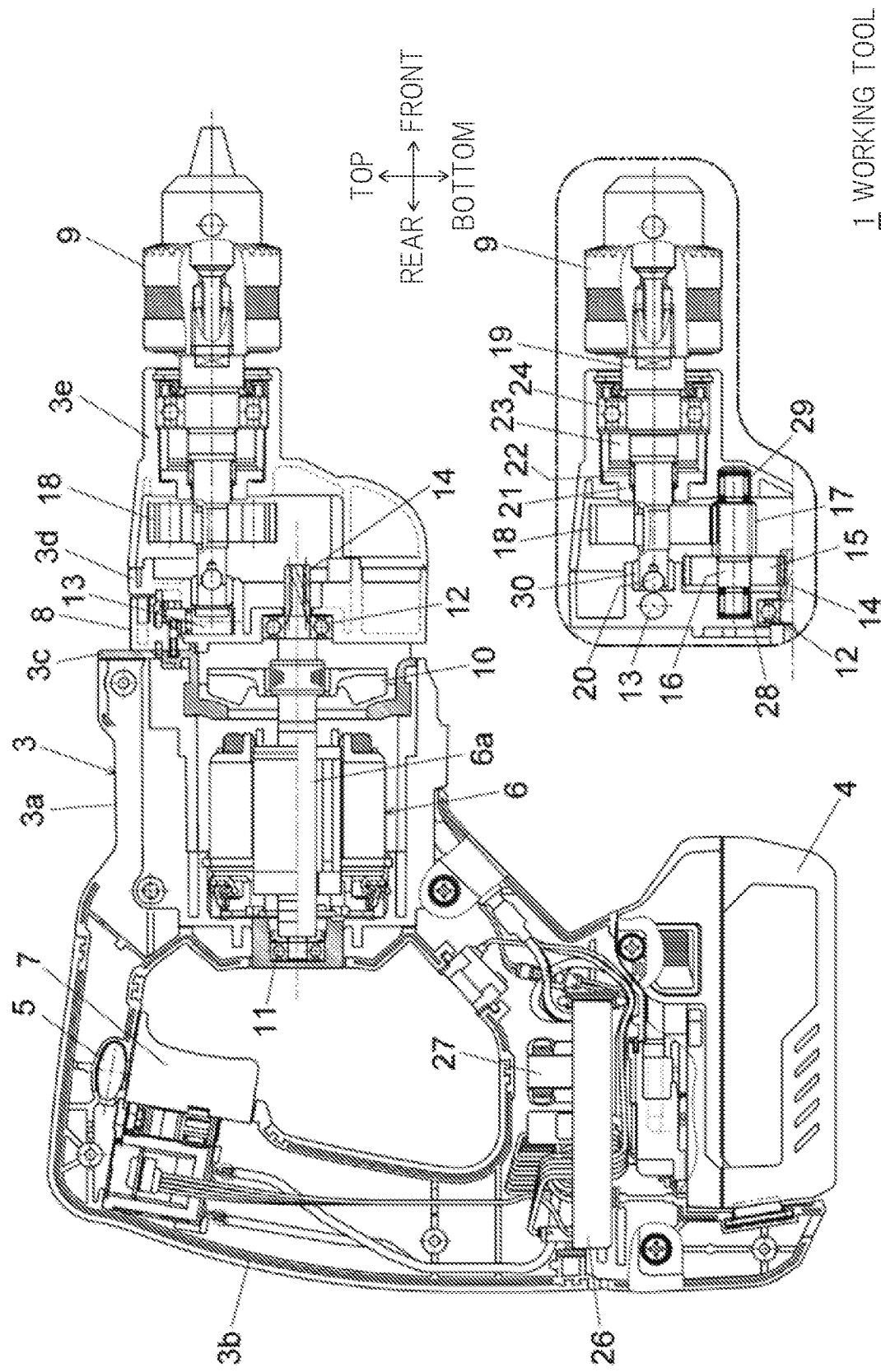
FIG. 4 is a side cross-sectional view of the working tool 1.

As shown in FIG. 4, the motor housing 3a houses the motor 6. A central axis of a rotation shaft 6a of the motor 6 is parallel to the front-rear direction. A rear portion of the rotation shaft 6a is supported by a bearing 11. A front portion of the rotation shaft 6a of the motor 6 is supported by a bearing 12. The bearings 11 and 12 are, for example, ball bearings. A fan 10 is attached to the front portion of the rotation shaft 6a on a rear side of the bearing 12. The fan 10 is surrounded by the fan guide 3c. The fan 10 rotates integrally with the motor 6 and generates an air flow for cooling the motor 6 and the like.

A first pinion 14 is formed on a portion of the rotation shaft 6a on a front side of the bearing 12. The first pinion 14 meshes with a first gear 15. The first gear 15 is provided on a rear portion of an intermediate shaft 16 and rotates integrally with the intermediate shaft 16. A central axis of the intermediate shaft 16 is parallel to the front-rear direction. A rear end portion of the intermediate shaft 16 is supported by a bearing 28. A front end portion of the intermediate shaft 16 is supported by a bearing 29. The bearings 28 and 29 are, for example, needle bearings.

On a front side of the first gear 15, a second pinion 17 is provided on the intermediate shaft 16. The second pinion 17 meshes with a second gear 18. The second gear 18 is provided on a rear portion of a spindle 19 and rotates integrally with the spindle 19. A central axis of the spindle 19 is parallel to the front-rear direction. Since the second gear 18 is spline-fitted so as to be slidable back and forth with respect to the second pinion 17, the spindle 19 can move back and forth with respect to the housing 3. The first pinion 14, the first gear 15, the second pinion 17, and the second gear 18 constitute a deceleration mechanism (rotation transmission mechanism). The deceleration mechanism is housed inside the intermediate cover 3d and the gear cover 3e. The rotation of the motor 6 is decelerated in two steps by the deceleration mechanism, and is transmitted to the spindle 19 and a tool bit 31.

A rear end portion of the spindle 19 is supported by a bearing 30. The bearing 30 is, for example, a needle bearing.

A steel ball (sphere) 20 is provided at the rear end portion of the spindle 19. A switching shaft 13 is rotatably supported by the intermediate cover 3d on a rear side of the steel ball 20. The switching shaft 13 has a cylindrical shape whose central axis is perpendicular to the front-rear direction, and has a concave portion partially cut out on an outer peripheral surface of an intermediate portion. A vibration drill mode is set when the concave portion of the switching shaft 13 faces the steel ball 20, and a drill mode is set when the outer peripheral surface of the switching shaft 13 other than the concave portion faces the steel ball 20. A mode switching lever 8 provided on the intermediate cover 3d is an operation unit for mode switching configured to rotate the switching shaft 13 about its own central axis. The worker can switch the mode between the vibration drill mode and the drill mode by operating the mode switching lever 8 in the left-right direction.

A first ratchet 21 is provided around the spindle 19 on a front side of the second gear 18. The first ratchet 21 is fixed to the gear cover 3e, and does not rotate with the spindle 19. A spring 22 is arranged around the spindle 19 so as to bias the spindle 19 forward with respect to the first ratchet 21. A second ratchet 23 is provided around the spindle 19 on a front side of the first ratchet 21. The second ratchet 23 is fixed to the spindle 19, and rotates together with the spindle 19. A front surface of the first ratchet 21 and a rear surface of the second ratchet 23 face each other. A pawl is provided on each of the front surface of the first ratchet 21 and the rear surface of the second ratchet 23. The spindle 19 is supported by a bearing 24 on a front side of the second ratchet 23. The bearing 24 is, for example, a ball bearing. A chuck (drill chuck) 9 is attached to a tip portion of the spindle 19 protruding forward from the gear cover 3e. As shown in FIG. 1, the bit (drill) 31 as a working portion can be detachably attached to the chuck 9.

In the drill mode, the outer peripheral surface (cylindrical outer peripheral surface) of the switching shaft 13 other than the concave portion is in face-to-face contact with the steel ball 20. Therefore, the spindle 19 cannot move in the front-rear direction with respect to the housing 3, and the front surface of the first ratchet 21 and the rear surface of the second ratchet 23 keep a separated state. Therefore, the spindle 19 continues to rotate without vibrating, and the drilling of a workpiece (member) by the drill attached to the chuck 9 is performed.

In the vibration drill mode, the concave portion of the switching shaft 13 faces the steel ball 20. Therefore, the spindle 19 can be retracted with respect to the housing 3 by the depth of the concave portion. Accordingly, when the drill attached to the chuck 9 is pressed to the workpiece, the spindle 19 moves backward with respect to the housing 3 against the bias of the spring 22, and the front surface of the first ratchet 21 and the rear surface of the second ratchet 23 come into contact with each other. Consequently, the vibration is given to the spindle 19 by the engagement of the pawl of the front surface of the first ratchet 21 and the pawl of the rear surface of the second ratchet 23. The vibration is also applied to the drill attached to the chuck 9 simultaneously with rotation, and the drilling operation of the workpiece is efficiently performed.

Figure 5:
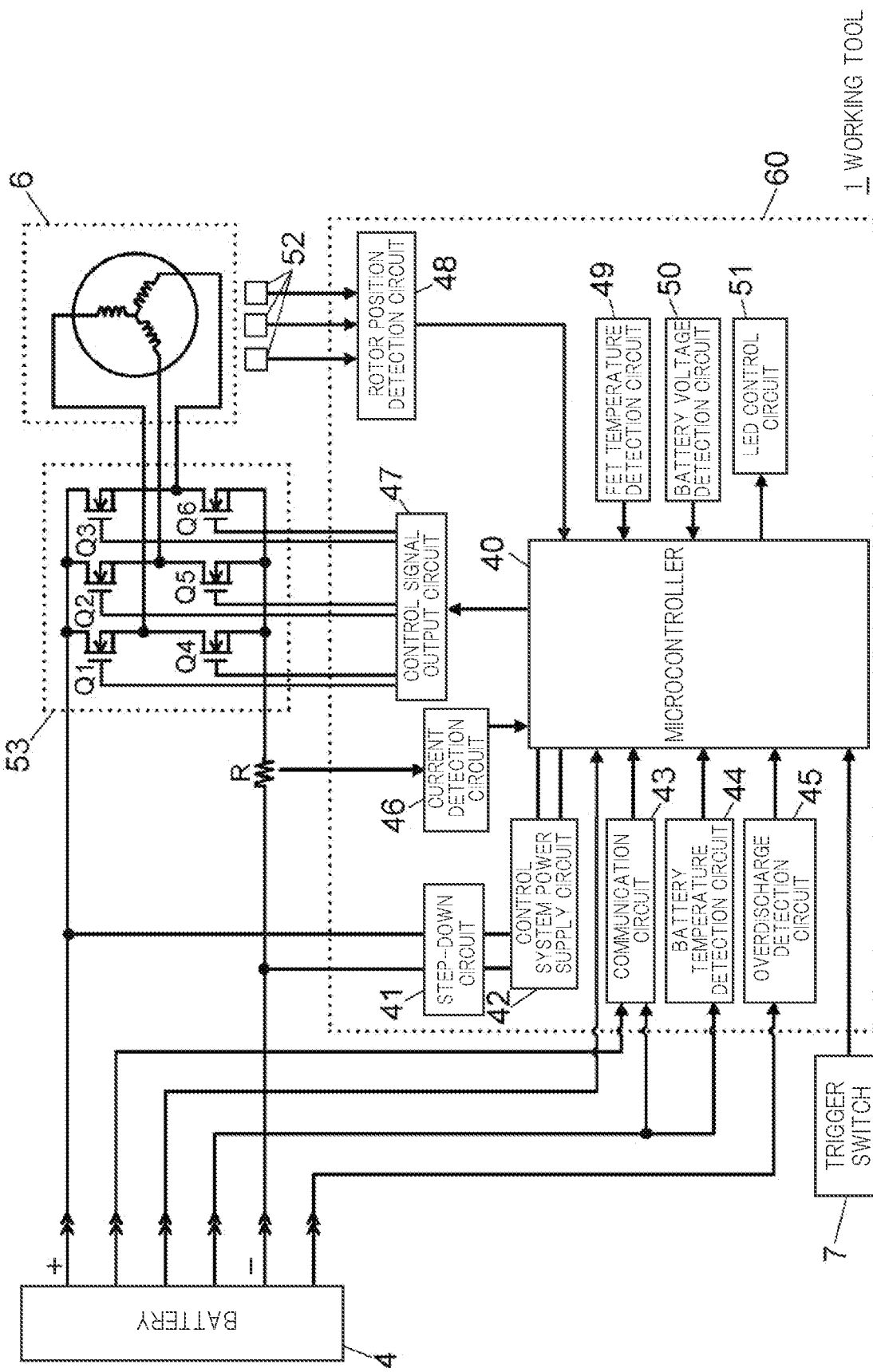
FIG. 5 is a circuit block diagram of the working tool 1.

FIG. 5 is a circuit block diagram of the working tool 1. An inverter circuit 53 and a control circuit unit 60 shown in FIG. 5 are provided on the control board 26 shown in FIG. 4. The inverter circuit 53 may be provided on a substrate different from the control circuit unit 60. The inverter circuit 53 includes six switching elements Q1 to Q6 such as FETs and IGBTs which are three-phase bridge connected. The switching element 27 shown in FIG. 4 corresponds to the switching elements Q1 to Q6 in FIG. 5. The switching elements Q1 to Q6 are turned on and off under the control of the microcontroller 40, for example, the PWM control (duty control), and convert DC power supplied from the battery pack 4 into AC power for driving the motor 6 and supply the AC power to the motor 6.

The control circuit unit 60 includes the microcontroller 40 as a control unit, a step-down circuit 41, a control system power supply circuit 42, a communication circuit 43, a battery temperature detection circuit 44, an overdischarge detection circuit 45, a current detection circuit 46, a control signal output circuit 47, a rotor position detection circuit 48, a FET temperature detection circuit 49, a battery voltage detection circuit 50, and an LED control circuit 51. The step-down circuit 41 steps down the output voltage of the battery pack 4. The control system power supply circuit 42 converts the output voltage of the step-down circuit 41 into a power supply voltage of the microcontroller 40, and supplies the power supply voltage to the microcontroller 40. The communication circuit 43 is a circuit for communication between the microcontroller 40 and the battery pack 4. The battery temperature detection circuit 44 detects the temperature of the battery pack 4 based on a temperature detection signal from the battery pack 4 and transmits the detected temperature to the microcontroller 40. The overdischarge detection circuit 45 detects overdischarge of the battery pack 4 based on an overdischarge detection signal from the battery pack 4 and transmits the detected overdischarge to the microcontroller 40.

The current detection circuit 46 detects a motor current based on a voltage of a resistor R provided in a path of a current of the motor 6 (hereinafter, referred to also as "motor current") and transmits the motor current to the microcontroller 40. The control signal output circuit 47 applies a control signal to each control terminal (each gate) of the switching elements Q1 to Q6 under the control of the microcontroller 40. The rotor position detection circuit 48 detects the rotational position of the motor 6 based on output signals of three magnetic sensors 52 (for example, Hall ICs) provided in the vicinity of the motor 6, and transmits the detected rotational position to the microcontroller 40. The FET temperature detection circuit 49 detects the temperatures of the switching elements Q1 to Q6 based on output signals of temperature sensors (for example, thermistors (not shown)) provided in the vicinity of the switching elements Q1 to Q6, and transmits the detected temperatures to the microcontroller 40. The battery voltage detection circuit 50 detects the output voltage of the battery pack 4 and transmits the output voltage to the microcontroller 40. The LED control circuit 51 controls lighting of an LED (not shown) under the control of the microcontroller 40.

The microcontroller 40 operates by the output voltage of the control system power supply circuit 42. The microcontroller 40 controls the switching elements Q1 to Q6 via the control signal output circuit 47 in accordance with the operation of the trigger switch 7, and controls the driving of the motor 6 (current supply to the motor 6). When stopping the motor 6, the microcontroller 40 stops the current supply to the motor 6. At this time, the microcontroller 40 may perform the brake control. The microcontroller 40 has a function of overload protection. The overload protection is protection when the load (torque) of the motor 6 becomes excessive, and includes short-circuit current protection (SD), overcurrent protection, and motor lock protection. The microcontroller 40 monitors the load of the motor 6 based on the motor current.

The short-circuit current protection is to stop the motor 6 when the motor current satisfies the short-circuit condition. The short-circuit condition is to detect a motor current equal to or higher than a short-circuit threshold (for example, 187 A) for a short-circuit determination time (for example, 10 μs). The overcurrent protection is to stop the motor 6 when the motor current satisfies the first or second overcurrent condition. The first overcurrent condition is to detect the motor current equal to or higher than a first overcurrent threshold (for example, 160 A) for a first determination time (for example, 1 msec). The second overcurrent condition is to detect the motor current equal to or higher than a second overcurrent threshold (for example, 60 A) for a second determination time (for example, 100 msec). The second overcurrent threshold corresponds to the clutch threshold in FIG. 7. The second overcurrent threshold is an example of the first threshold of the present invention. The motor lock protection is to stop the motor 6 when the rotation speed of the motor 6 (hereinafter, referred to also as "motor rotation speed") becomes equal to or less than a threshold.

The microcontroller 40 has a quick stop function of the motor 6. The quick stop function is a function of stopping the motor 6 when a rapid increase of the motor current (steep current slope) is detected. The rapid increase of the motor current is that the motor current increases from a first quick stop threshold (first RFC threshold) (for example, 40 A) to a second quick stop threshold (second RFC threshold) (for example, 60 A) within a rapid increase determination time (for example, 10 msec). The rapid increase of the motor current occurs when the tool bit 31 is unexpectedly locked in the hole of the workpiece regardless of the strength of the pressing force of the tool bit 31 to the workpiece. The unexpected lock is, for example, a lock that occurs when the tool bit 31 unintentionally hits a hard portion of a workpiece during the drilling operation. On the other hand, when the tool bit 31 is locked in the hole of the workpiece due to the too strong pressing force of the tool bit 31 to the workpiece, the increase of the motor current becomes relatively gentle. As will be described later, in the present embodiment, different control is performed depending on whether or not the increase of the motor current when the motor current exceeds the second overcurrent threshold is steep.

In the working tool 1, the following four states are present as the control state (control mode) of the motor 6 by the microcontroller 40.

1. Stop State: The stop state is the state in which the motor 6 is stopped, and the drive control of the motor 6 by the microcontroller 40 is not performed.
2. Activation State (Activation Mode): The activation state is the state before a first predetermined time, for example, 300 msec elapses after the microcontroller 40 activates the motor 6. In the activation state, the microcontroller 40 stops the motor 6 when detecting a rapid increase of the motor current or overload. When stopped in the activation state, retry control described later is not performed. When the first predetermined time elapses while the motor 6 is being driven after the activation of the motor 6, the microcontroller 40 transitions to the next driving state.
3. Driving State (Normal Mode): In the driving state, the control by the microcontroller 40 differs between the case where a rapid increase of the motor current is detected and the case where an overload is detected. When a rapid increase of the motor current is detected, the microcontroller 40 determines that an impact is to be applied to the main body (kickback occurs) due to sudden locking of the motor 6, and stops the motor 6. In this way, it is possible to suppress the breakdown of the working tool 1 by suppressing kickback and heat generation. The worker performs an OFF operation on the trigger switch 7 (releases the operation of the trigger switch 7), thereby releasing the error due to the rapid increase of the motor current (returning to a state in which the motor 6 can be driven by pulling the trigger switch 7). When overload is detected without detecting the rapid increase of the motor current, the microcontroller 40 stops the motor 6 and transitions to the next retry state. Detecting overload without detecting the rapid increase of the motor current in the driving state is an example of increasing the torque of the motor 6 in a predetermined manner, and is an example of satisfying the first condition of the present invention.
4. Retry State (Retry Mode): In the retry state, the microcontroller 40 stops the motor 6 (performs the stop control) as the overcurrent protection also when the third overcurrent condition is satisfied. The third overcurrent condition is to detect the motor current equal to or larger than the third overcurrent threshold value (for example, 30 A) that is lower than the currents in the activation state and the driving state for the third determination time (for example, 1 msec). The third overcurrent threshold corresponds to the second clutch threshold in FIG. 7. The third overcurrent threshold is an example of the second threshold of the present invention. The addition of the third overcurrent condition is intended to reduce the reaction due to retry. In the retry state, when the rapid increase of the motor current or overload is detected within a second predetermined time, for example, 500 msec from the activation of the motor 6, the microcontroller 40 stops the motor 6 and immediately restarts (retries). When the second predetermined time elapses while the motor 6 is being driven after the activation of the motor 6, the microcontroller 40 transitions to the above-described driving state. Elapsing the second predetermined time while the motor 6 is being driven after the activation of the motor 6 in the retry state is an example of satisfying the second condition of the present invention. When the restart (retry control) after the stop control of the motor 6 is repeated a predetermined number of times (for example, 10 times), the microcontroller 40 does not perform any more retry control and keeps the motor 6 in the stop state.

Figure 6:
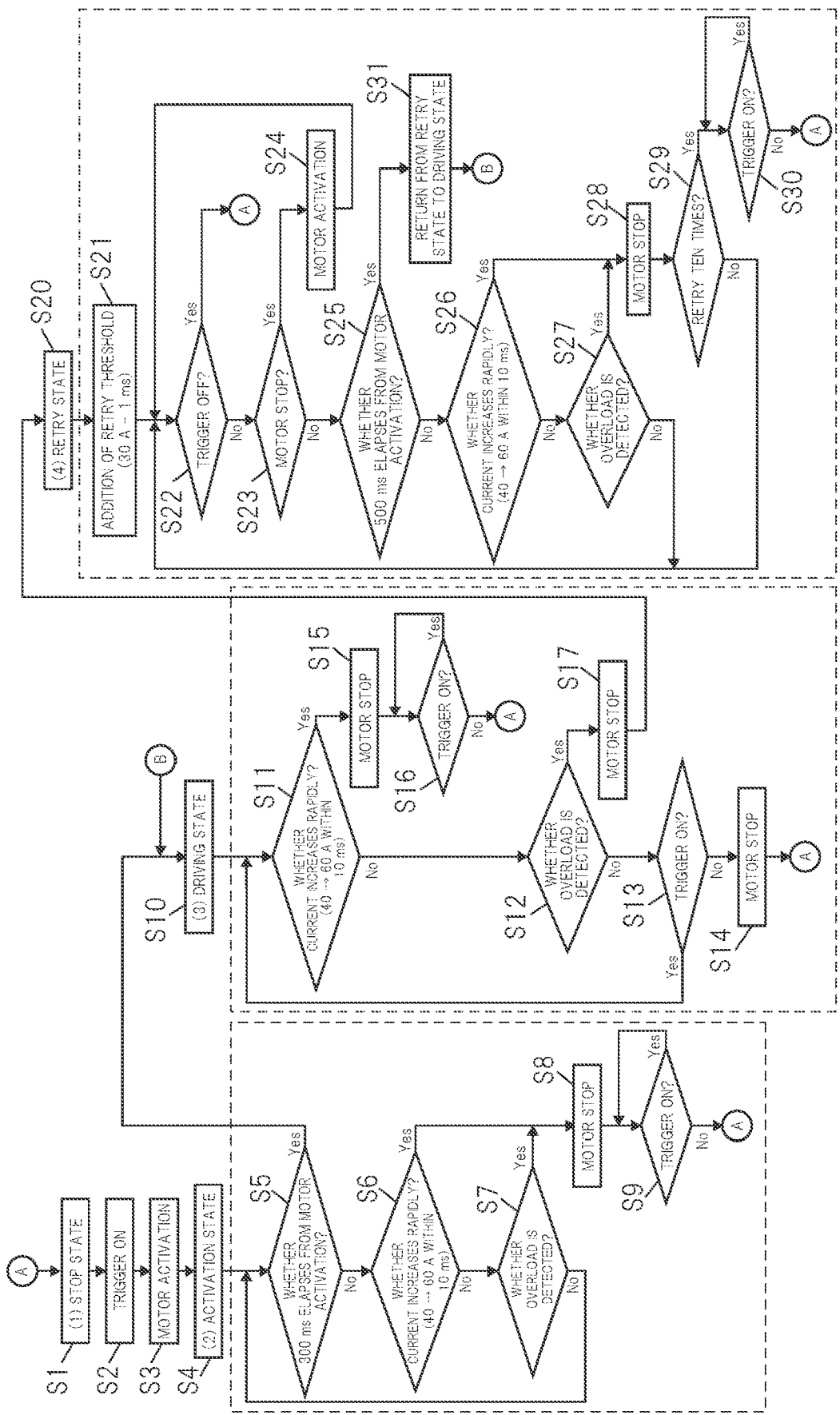
FIG. 6 is a control flow chart of the working tool 1.

FIG. 6 is a control flowchart of the working tool 1. When the trigger switch 7 is turned on in the stop state (S1) that is the initial state (S2), the microcontroller 40 activates the motor 6 (S3) and enters the activation state of the motor 6 (S4). When detecting the rapid increase of the motor current or overload (Yes in S6 or Yes in S7) before 300 msec elapses from the activation of the motor 6 (No in S5), the microcontroller 40 stops the motor 6 (S8). Thereafter, the microcontroller 40 does not activate the motor 6 even if the trigger switch 7 is continuously turned on (Yes in S9), and returns to S1 when the trigger switch 7 is turned off (No in S9). When 300 msec elapses from the activation of the motor 6 (Yes in S5) without detecting the rapid increase of the motor current and the overload (No in S6 and No in S7), the microcontroller 40 transitions to the driving state of the motor 6 (S10).

In the driving state, when the rapid increase of the current and the overload are not detected (No in S11 and No in S12), the microcontroller 40 continues driving the motor 6 as long as the trigger switch 7 is turned on (Yes in S13). When the trigger switch 7 is turned off (No in S13), the microcontroller 40 stops the motor 6 (S14), and returns to S1. When detecting the rapid increase of the motor current (Yes in S11), the microcontroller 40 stops the motor 6 (S15). Thereafter, the microcontroller 40 does not activate the motor 6 even if the trigger switch 7 is continuously turned on (Yes in S16), and returns to S1 when the trigger switch 7 is turned off (No in S16). When detecting the overload without detecting the rapid increase of the motor current (No in S11) (Yes in S12), the microcontroller 40 stops the motor 6 (S17) and transitions to the retry state (S20).

In the retry state, the microcontroller 40 adds a retry threshold for the overload protection (S21). The addition of the retry threshold corresponds to the addition of the third overcurrent condition (30 A×1 msec) described above. When the trigger switch 7 is off (Yes in S22), the microcontroller 40 stops the motor 6 and then returns to S1. When the trigger switch 7 is on (No in S22), the microcontroller 40 activates the motor 6 (S24) if the motor 6 is stopped (Yes in S23). When the motor 6 is not stopped (No in S23), the microcontroller 40 stops the motor 6 (S28) when the rapid increase of the motor current or the overload is detected (Yes in S26 or Yes in S27) before 500 msec elapses from the activation of the motor 6 (No in S25). Thereafter, if the number of retries, that is, the number of times the motor 6 is activated in S24 is less than 10 (No in S29), the microcontroller 40 returns to S22. When the number of retries is 10 (Yes in S29), the microcontroller 40 does not activate the motor 6 even if the trigger switch 7 is continuously turned on (Yes in S30), and returns to S1 when the trigger switch 7 is turned off (No in S30). When 500 msec elapses from the activation of the motor 6 (Yes in S25) without detecting the rapid increase of the motor current and the overload in the state where the trigger switch 7 is continuously turned on (No in S22, No in S23, No in S26, and No in S27), the microcontroller 40 returns from the retry state to the driving state (S31). The retry threshold (30 A×1 msec) added in S21 is deleted when the retry state ends.

Figure 7:
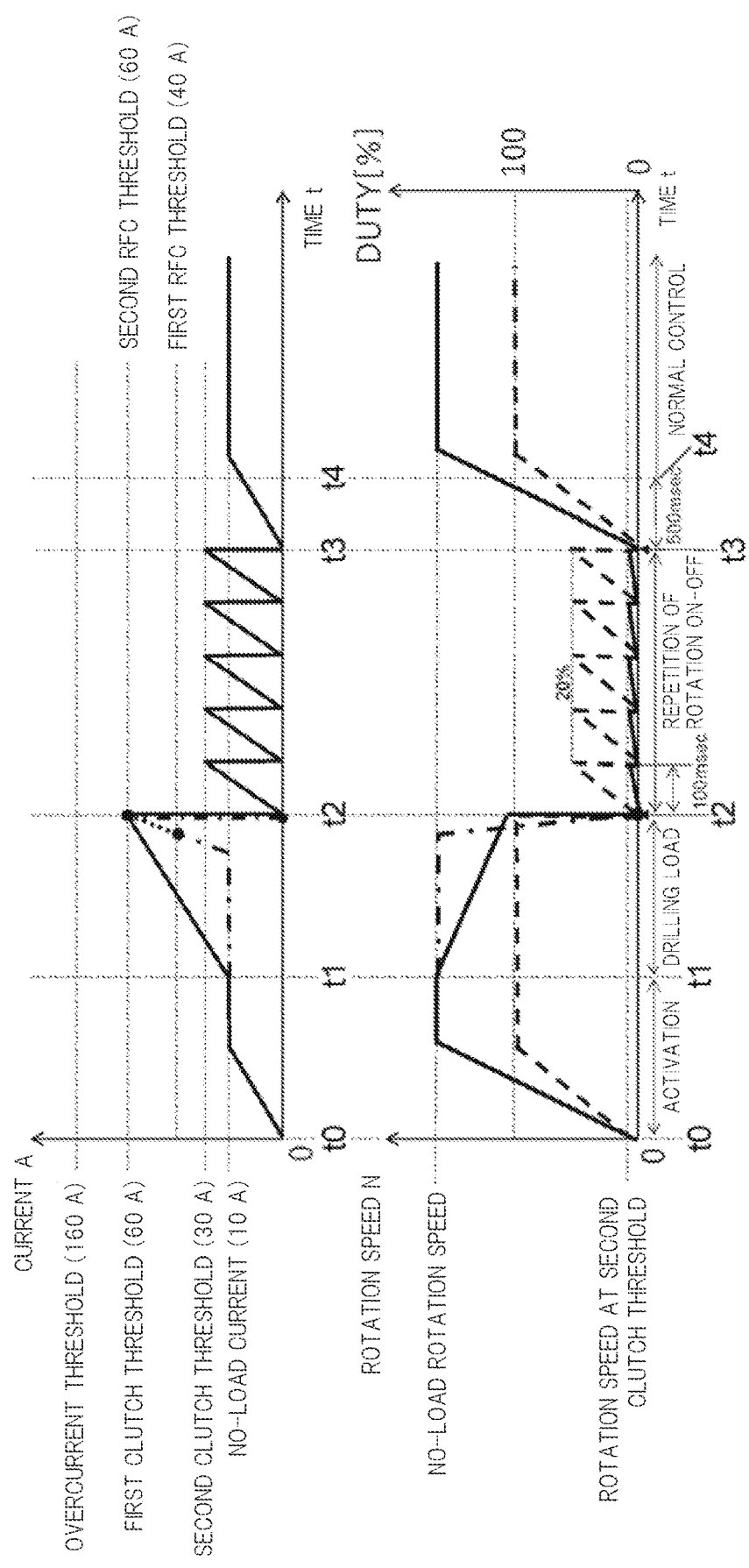
FIG. 7 is a graph showing an example of each change in the current flowing through a motor 6 in the working tool 1, the rotation speed of the motor 6, and the duty of rotation control of the motor 6.

FIG. 7 is a graph showing an example of each change in motor current, motor rotation speed, and duty of rotation control of the motor 6 (hereinafter, simply referred to also as "duty") in the working tool 1. Two cases are shown together in FIG. 7, and the solid lines of the current graph and the rotation speed graph correspond to Case 1, and the dashed-dotted lines correspond to Case 2. In addition, the duty only in the Case 1 is shown by a dotted line. In FIG. 7, in the period from time t2 to time t3, the time axis on the horizontal axis and the duty on the vertical axis are enlarged from the viewpoint of easy viewing.

First, the Case 1 will be described. The microcontroller 40 activates the motor 6 at time t0. At this time, the tool bit 31 is not in contact with the workpiece and is in a no-load state. In the activation control of the motor 6, the microcontroller 40 slowly increases the duty to the target value and slowly increases the motor current and the motor rotation speed by the soft start control. At time t1, the tool bit 31 is pressed to the workpiece, and the drilling operation is started. Then, the motor current increases along with the increase in the load, and the motor rotation speed decreases. At time t2, when the tool bit 31 is locked (stopped) in the hole of the workpiece by the load and the motor current becomes 60 A, the microcontroller 40 reduces the duty to Q. As a result, the motor current becomes 0, and the motor 6 stops.

The microcontroller 40 executes the retry mode after time t2. Specifically, the microcontroller 40 repeats control of activating the motor 6 again after the motor 6 is stopped and stopping the motor 6 when the motor current becomes 30 A. The soft start control is performed also at the time of activating the motor 6 in the retry control. During the period from time t2 to time t3, the tool bit 31 is locked, and the tool bit 31 does not rotate even when the motor 6 is activated. During this period, even if the motor 6 is activated, the motor 6 only slightly rotates by the play of the meshing of the gears. The time from restart to stop of the motor 6 when the tool bit 31 is locked is, for example, about 100 msec. In addition, the duty immediately before the motor 6 stops in this case is, for example, about 20%. When the worker takes the tool bit 31 out of the hole of the workpiece at time t3 (removes the load applied to the tool bit 31), the motor current does not exceed 30 A even at time t4 at which 500 msec has elapsed from the activation, in the subsequent activation of the motor 6. Thus, the microcontroller 40 ends the retry mode and returns to the normal control for continuously driving the motor 6 (control of S10 to S17 in FIG. 6). The worker can perform the drilling operation on the workpiece again while turning on the trigger switch 7.

Next, the Case 2 will be described. In the Case 2, immediately before time t2, the tool bit 31 is suddenly locked from the no-load state. Therefore, the motor current rapidly increases from 40 A to 60 A within 10 msec. In this case, the microcontroller 40 lowers the duty to 0 and stops the motor 6. When the motor 6 is stopped due to a rapid increase of the motor current, the microcontroller 40 does not execute the retry mode described above.

Figure 8:
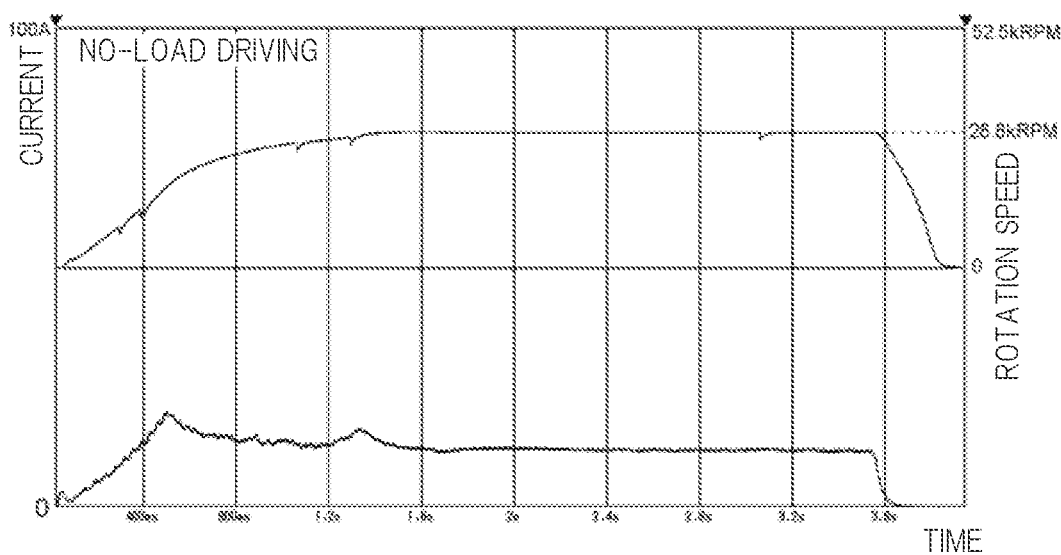
FIG. 8 is a waveform diagram of the actually measured rotation speed of the motor 6 and the actually measured current flowing through the motor 6 in a no-load driving of the working tool 1.
Figure 9:
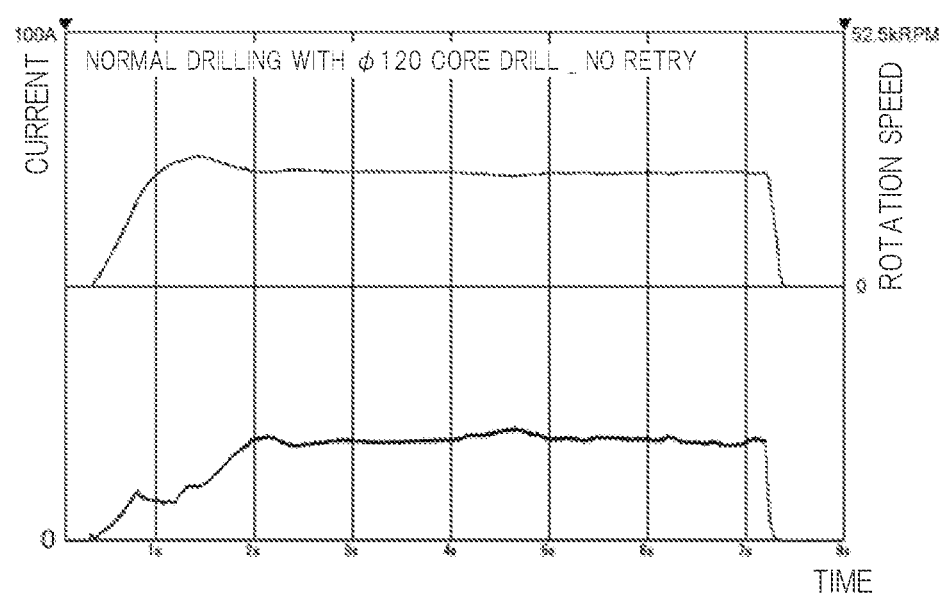
FIG. 9 is a waveform diagram of the actually measured rotation speed of the motor 6 and the actually measured current flowing through the motor 6 in a normal drilling operation of the working tool 1.

FIG. 8 is a waveform diagram of the actually measured motor rotation speed and motor current in a no-load driving of the working tool 1. In FIG. 8, the upper part indicates the motor rotation speed, and the lower part indicates the motor current. The same applies to FIG. 9 to FIG. 12. The waveform diagram of FIG. 8 corresponds to the case where S1 to S14 in FIG. 6 are performed without bringing the tool bit 31 into contact with the workpiece. FIG. 9 is a waveform diagram of the actually measured rotation speed of the motor 6 and the actually measured current flowing through the motor 6 in a normal drilling operation of the working tool 1. This waveform diagram corresponds to the case where S1 to S14 in FIG. 6 are performed in the state where the tool bit 31 is brought into contact with the workpiece.

Figure 10:
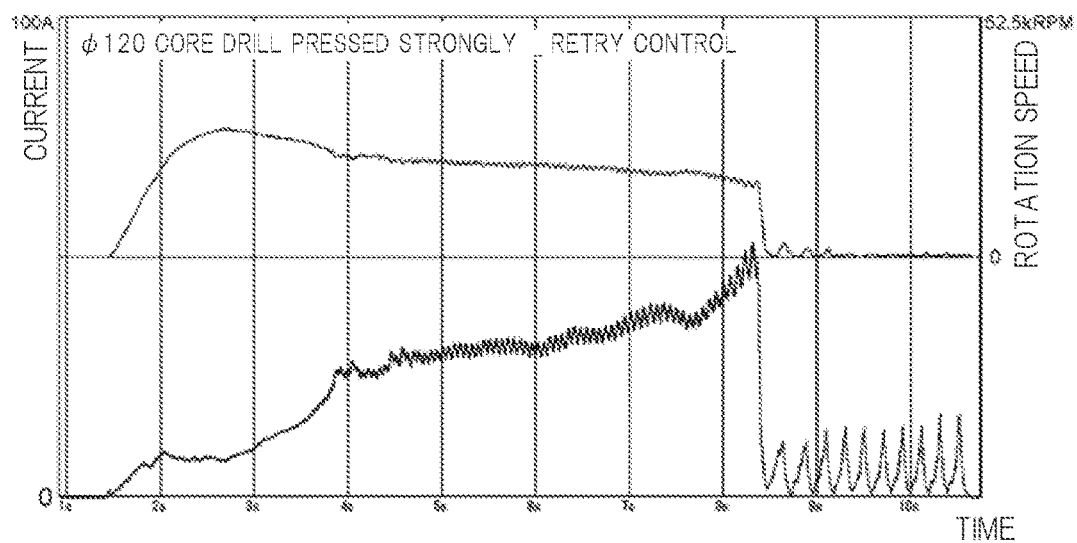
FIG. 10 is a waveform diagram of the actually measured rotation speed of the motor 6 and the actually measured current flowing through the motor 6 in an operation of stopping the motor 6 when it is not possible to return to a normal control after transitioning to a retry mode in the working tool 1.

FIG. 10 is a waveform diagram of the actually measured motor rotation speed and motor current in an operation of stopping the motor 6 when it is not possible to return to a normal control after transitioning to a retry mode in the working tool 1. This waveform diagram corresponds to the case where S1 to S13, S11, S12, S17, and S20 to S30 in FIG. 6 are performed in the state where the tool bit 31 is brought into contact with the workpiece.

Figure 11:
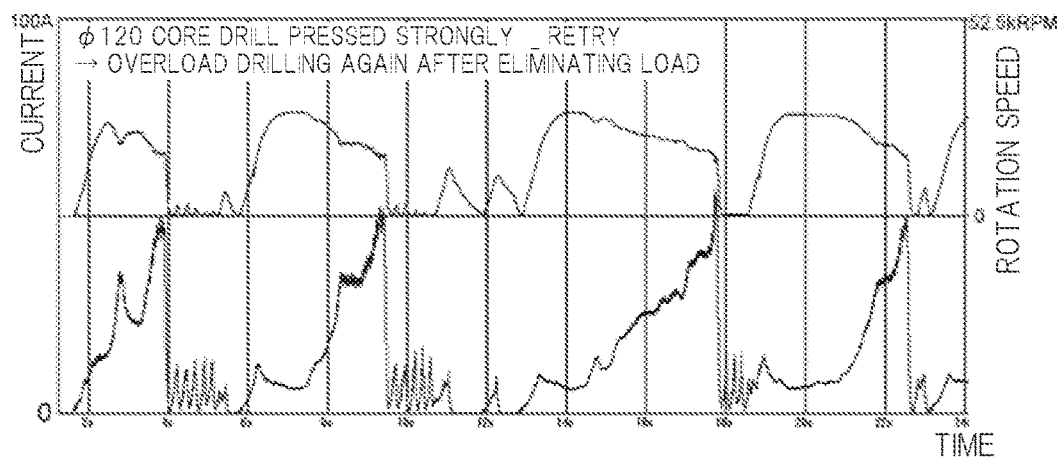
FIG. 11 is a waveform diagram of the actually measured rotation speed of the motor 6 and the actually measured current flowing through the motor 6 in an operation of repeating the normal mode and the retry mode in the working tool 1.

FIG. 11 is a waveform diagram of the actually measured rotation speed of the motor 6 and the actually measured current flowing through the motor 6 in an operation of repeating the normal mode and the retry mode in the working tool 1. This waveform diagram corresponds to the case where S1 to S13, S11, S12, S17, S20 to S29, S22 to S25, and S31 in FIG. 6 are repeatedly performed in the state where the tool bit 31 is brought into contact with the workpiece.

Figure 12:
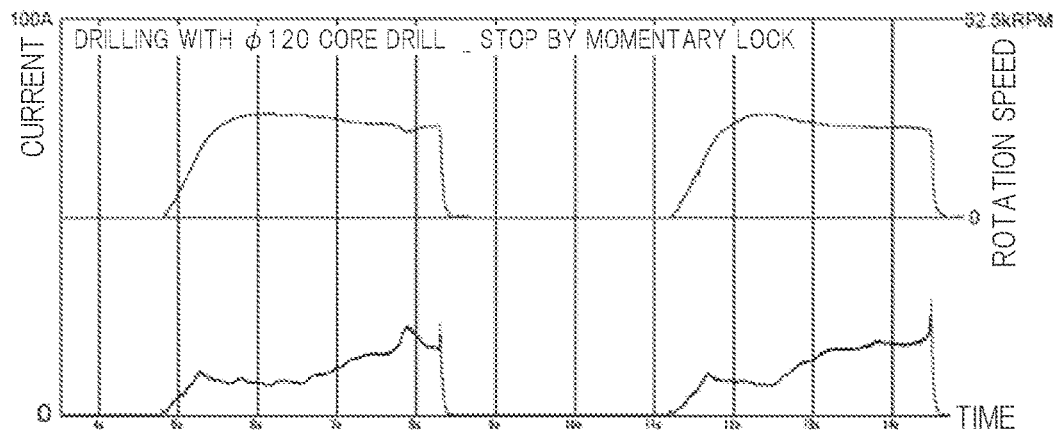
FIG. 12 is a waveform diagram of the actually measured rotation speed of the motor 6 and the actually measured current flowing through the motor 6 in an operation of stopping the motor 6 due to overload in the middle of normal control in the working tool 1.

FIG. 12 is a waveform diagram of the actually measured motor rotation speed and motor current in an operation of stopping the motor 6 due to overload in the middle of normal control in the working tool 1. This waveform diagram corresponds to the case where S1 to S13, S11, and S15 in FIG. 6 are performed in the state where the tool bit 31 is brought into contact with the workpiece. Note that the waveforms in FIG. 9 to FIG. 12 are results obtained when a core drill having a diameter of 120 mm is used as the tool bit 31.

According to the present embodiment, the following effects can be achieved.
(1) The microcontroller 40 executes the retry mode with respect to the locking of the tool bit 31 when the force of pressing the tool bit 31 to the workpiece (hereinafter, referred to as "pressing force") is too strong, and returns to the normal mode if the pressing force of the tool bit 31 is weakened during execution of the retry mode even when the trigger switch 7 is kept on. Therefore, the worker does not need to operate the trigger switch 7 again after the tool bit 31 is locked, and thus the workability is improved.
(2) In the retry mode, the microcontroller 40 repeats the stop and restart of the motor. This makes it possible to notify the worker that the pressing force is too strong, and to prompt the worker to weaken the pressing force. In other words, the retry mode allows the worker to know that the pressing force is too strong and to obtain a trigger to weaken the pressing force, and thus the workability is improved.
(3) When detecting the rapid increase of the motor current, the microcontroller 40 stops the motor 6 without transitioning to the retry mode. On the other hand, when detecting the overload without accompanying the rapid increase of the motor current, the microcontroller 40 transitions to the retry mode. Consequently, the kickback in which the housing 3 is swung around when the tool bit 31 is unexpectedly locked is suppressed, and the workability can be improved as described above by executing the retry mode for the locking of the tool bit 31 due to the too strong pressing force.
(4) Since the microcontroller 40 adds a stop condition (30 A×1 msec) by a motor current lower than that in the normal mode in the retry mode, the torque (load) applied to the worker's hand in the retry mode is reduced, and thus the workability is improved.

In the foregoing, the present invention has been described based on the embodiment, but it will be understood by those skilled in the art that various modifications can be made to each component and each process of the embodiment within the range described in claims. Hereinafter, modifications will be described.

The microcontroller 40 may monitor the load (torque) of the motor 6 by the motor rotation speed. In this case, the microcontroller 40 may be configured to transition to the retry mode if the decrease of the motor rotation speed when the motor rotation speed falls below the threshold rotation speed is gentle, and stop the motor 6 without transitioning to the retry mode if the decrease is steep. The working tool 1 is not limited to a vibration drill, and may be another drilling tool such as a hammer drill or may be a working tool whose tool bit may be locked other than a drilling tool.

REFERENCE SIGNS LIST

1: working tool, 3: housing, 3a: motor housing, 3b: handle portion, 3c: fan guide, 3d: intermediate cover, 3e: gear cover, 4: battery pack, 5: forward-reverse switch, 6: motor (electric motor), 6a: rotation shaft (output shaft), 7: trigger switch, 8: mode switching lever, 9: chuck, 10: fan, 11, 12: bearing, 13: switching shaft, 14: pinion, 15: first first gear, 16: intermediate shaft, 17: second pinion, 18: second gear, 19: spindle, 20: steel ball (sphere), 21: first ratchet, 22: spring, 23: second ratchet, 24: bearing, 26: control board, 27: switching element, 28, 29: bearing, 30: bearing, 31: tool bit (drill bit), 40: microcontroller (control unit), 41: step-down circuit, 42: control system power supply circuit, 43: communication circuit, 44: battery temperature detection circuit, 45: over-discharge detection circuit, 46: current detection circuit, 47: control signal output circuit, 48: rotor position detection circuit, 49: FET temperature detection circuit, 50: battery voltage detection circuit, 51: LED control circuit, 52: magnetic sensor (Hall IC), 53: inverter circuit, 60: control circuit unit

The invention claimed is:

1. A working tool comprising:
a motor;
a working portion driven by the motor and configured to be able to perform a predetermined work;
a control unit configured to control the motor; and
an operation unit configured to instruct the control unit to drive the motor,
wherein the control unit is configured to
execute a normal mode for continuously driving the motor when the operation unit is operated,
execute a retry mode in which a stop control to stop the motor and a retry control to drive the motor at a torque or rotation speed lower than a first condition are alternately repeated when the first condition is satisfied during execution of the normal mode, and
stop the retry mode and continuously drive the motor when a second condition is satisfied during execution of the retry mode.

2. The working tool according to claim 1,
wherein the control unit is configured to determine that the first condition is satisfied when the torque applied to the motor increases in a predetermined manner and/or when a rotation speed of the motor decreases in a predetermined manner.

3. The working tool according to claim 1,
wherein the control unit is configured to determine that the first condition is satisfied when the torque applied to the motor reaches a first threshold.

4. The working tool according to claim 3,
wherein the control unit is configured to perform the retry control until the torque applied to the motor reaches a second threshold and perform the stop control when the torque applied to the motor reaches the second threshold, in the retry mode.

5. The working tool according to claim 4,
wherein the second threshold is defined as a value smaller than the first threshold.

6. The working tool according to claim 4,
wherein the control unit is configured to determine that the second condition is satisfied when a state where the torque applied to the motor does not reach the second threshold continues for a predetermined time.

7. The working tool according to claim 1,
wherein the control unit continues the stop control when the retry control is repeated a predetermined number of times.

8. A control method using a working tool, the working tool including:
a motor;
a tool bit driven by the motor and configured to perform a predetermined work;
a control unit configured to control the motor; and
an operation unit configured to instruct the control unit to drive the motor, and
the control method comprising:
a first step in which a worker operates the operation unit and the control unit continuously drives the motor to rotate the tool bit, thereby performing the predetermined work;

a second step in which the tool bit is stopped due to a load;
a third step in which the control unit executes a retry mode in which a stop control to stop the motor and a retry control to drive the motor are alternately repeated;
a fourth step in which the worker eliminates the load applied to the tool bit; and
a fifth step in which the control unit stops the retry mode and continuously drives the motor to rotate the tool bit, thereby performing the predetermined work.

9. The control method according to claim 8, wherein, in the retry control in the third step, the motor is driven at a torque smaller than that of the motor driving in the first step.

10. The control method according to claim 8, wherein, in the motor driving in the fifth step, the motor is driven at a torque larger than that of the motor driving in the third step.

11. The control method according to claim 8, wherein the stop control is continued when the retry control in the third step is repeated a predetermined number of times.

12. The control method according to claim 8, wherein, when increase of the load per unit time in the second step is a rapid increase, the motor driving is stopped without transitioning to the third step.

13. The control method according to claim 8, wherein the tool bit is continuously in a stop state from when it is stopped in the second step to when it is rotated in the fifth step.

* * * * *